J. N. BACK.
NUT LOCK.
APPLICATION FILED SEPT. 14, 1910.
1,011,711.
Patented Dec. 12, 1911.
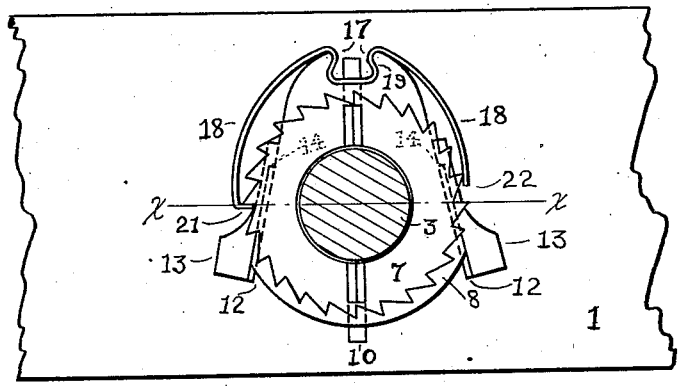
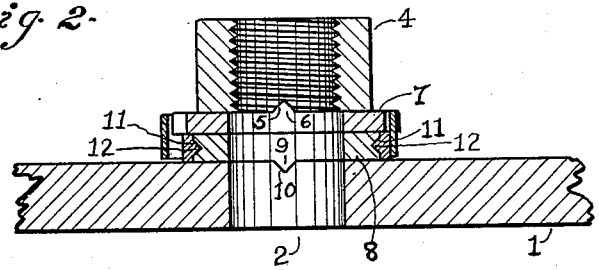
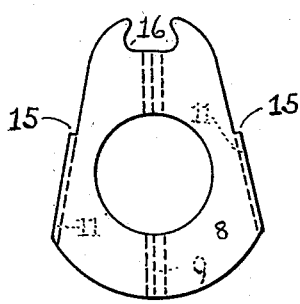
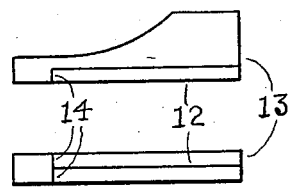
Witnesses:
Inventor
John Nels Back.
by Fred P. Gorin
Attorney

UNITED STATES PATENT OFFICE.

JOHN NELS BACK, OF SEATTLE, WASHINGTON.

NUT-LOCK.

1,011,711.  Specification of Letters Patent.  Patented Dec. 12, 1911.

Application filed September 14, 1910. Serial No. 582,075.

*To all whom it may concern:*

Be it known that I, JOHN NELS BACK, a citizen of the United States, and a resident of Seattle, in the county of King and State of Washington, have invented certain new and useful Improvements in Nut-Locks, of which the following is a full, true, and exact specification.

The principal object of this invention is to provide a lock of this character which is simple, compact and effective, and in the use of which a nut may be screwed to a bolt in the usual manner, the lock operating automatically at close intervals, to prevent retrograde movement of the nut.

Other objects will appear as the invention is more fully disclosed in the following specification and accompanying drawings, in which—

Figure 1 is a plan view of my improved lock, in place upon an ordinary fish plate, the fish plate shown in broken end lines, and the nut being omitted. Fig. 2 is a central sectional view substantially upon the line *x—x* of Fig. 1, the bolt omitted. Fig. 3, a detached view of the plate. Fig. 4, an enlarged detached side view of one of the wedges. Fig. 5, an edgewise view of the wedge from the under side.

Reference sign 1 designates the fish plate having the opening 2 therein to receive the bolt 3, having the male threads, as shown, which enter the female threads of the nut 4, which nut has the V shaped notch or recess 5 to receive the corresponding V shaped projection 6 of the ratchet wheel 7. 8 designates the plate having the V shaped projection 9 which enters a corresponding recess 10 in the fish plate 1. At the edges of the plate 8 are V shaped recesses 11 which receive the correspondingly shaped edges 12 of the wedges 13. Upon the wedges 13 are the shoulders 14 which fit the shoulders 15 of the plate 8. At the top of the plate 8 is the recess 16 in which tightly fits the loop 17 in the spring 18. The edges 19 of the loop 17 may be upset or forced over to firmly secure the loop in the recess 16. The spring 18 terminates at one end in the hook 21, its opposite end 22 being straight and terminating in a plane above that of the hook 21 a distance approximately equal to one-half the width of one of the teeth of the ratchet wheel 7.

The operation of my device is as follows;—The plate is first placed upon the fish plate 1, with the projection 9 inserted into the recess 10, the ratchet wheel 7 placed upon the plate 8 in the position shown in Fig. 2, the nut 4 screwed down upon the bolt 3 until the V shaped projection 6 upon the ratchet wheel 7 is almost in contact with the under surface of the nut 4, when the ratchet wheel 7 is rotated to bring the projection 6 into register with the recess 5, after which the ratchet wheel 7 and nut 4 will turn together until the nut 4 is firmly screwed down upon the bolt 3, the ends 21 and 22 of the spring 18 yieldingly riding over the points of the teeth of the ratchet wheel 7 the while. After the nut 4 is screwed down as shown in Fig. 2, any retrograde movement thereof is prevented by the ends 21 and 22 of the spring 18. It will be observed that the teeth of the ratchet wheel 7 are relatively large and strong, and that, due to the unequal lengths of the spring 18 upon each side of the loop 17, the greatest retrograde movement possible of the nut 4 is a distance no greater than one-half the distance between the points of the teeth of the ratchet wheel 7. When it is desired to remove the nut 4 from the bolt 3, the wedges 13 are forced upward sufficiently to spring the members 18 out of engagement with the teeth of the ratchet wheel 7, when the nut may be unscrewed in the usual manner.

I am fully aware that nut locks of various constructions are not new in the art and I do not, therefore, claim the same broadly, but, so far as I am aware, serious defects have heretofore existed, chief of which being that the locking operation was not automatic and that comparatively few locking points were provided, so that the nut would have to be locked before it was entirely screwed home upon the bolt, or else the threads damaged by forcing the nut around t othe next locking point.

While I have shown and described a particular form of embodiment of my invention, I am fully aware that many changes in the details of construction thereof will readily suggest themselves to others skilled in the art, without departing from the spirit and scope of the invention, and I do not, therefore, desire to be limited to exact details of construction herein shown and described.

Having described my invention, what I claim as new and desire to protect by Letters Patent of the United States, is—

1. A nut lock comprising a main plate perforated to receive a bolt, means for preventing movement of said plate with relation to the work, a ratchet wheel adapted to revolve upon the bolt, means for locking said ratchet wheel to the nut and resilient pawls of unequal lengths permitting rotation of the ratchet wheel in one direction and preventing rotation thereof in the opposite direction.

2. A nut lock comprising a main plate perforated to receive a bolt, means for preventing movement of said plate with relation to the work, a ratchet wheel adapted to revolve upon the bolt, means for locking said ratchet wheel to the nut and resilient pawls of unequal lengths secured to the said plate, permitting rotation of the ratchet wheel in one direction and preventing rotation thereof in the opposite direction.

3. A nut lock comprising a main plate perforated to receive a bolt, means for preventing movement of said plate with relation to the work, a ratchet wheel adapted to revolve upon the bolt, means for locking said ratchet wheel to the nut, spring members of unequal lengths secured to the main plate which permit rotation of the ratchet wheel in one direction and prevent rotation thereof in the opposite direction, grooves in the edges of said main plate, wedges adapted to enter said grooves, means upon the main plate to prevent movement of said wedges in one direction of their lengths, the faces of said wedges adapted, when forced in one direction, to force said spring members out of operative engagement with said ratchet wheel.

JOHN NELS BACK.

Witnesses:
 FRED P. GORIN,
 G. R. REANEY.